March 9, 1926.
A. C. BRADSHAW
STALK CUTTING MACHINE
Filed March 3, 1925
1,576,405
3 Sheets—Sheet 1
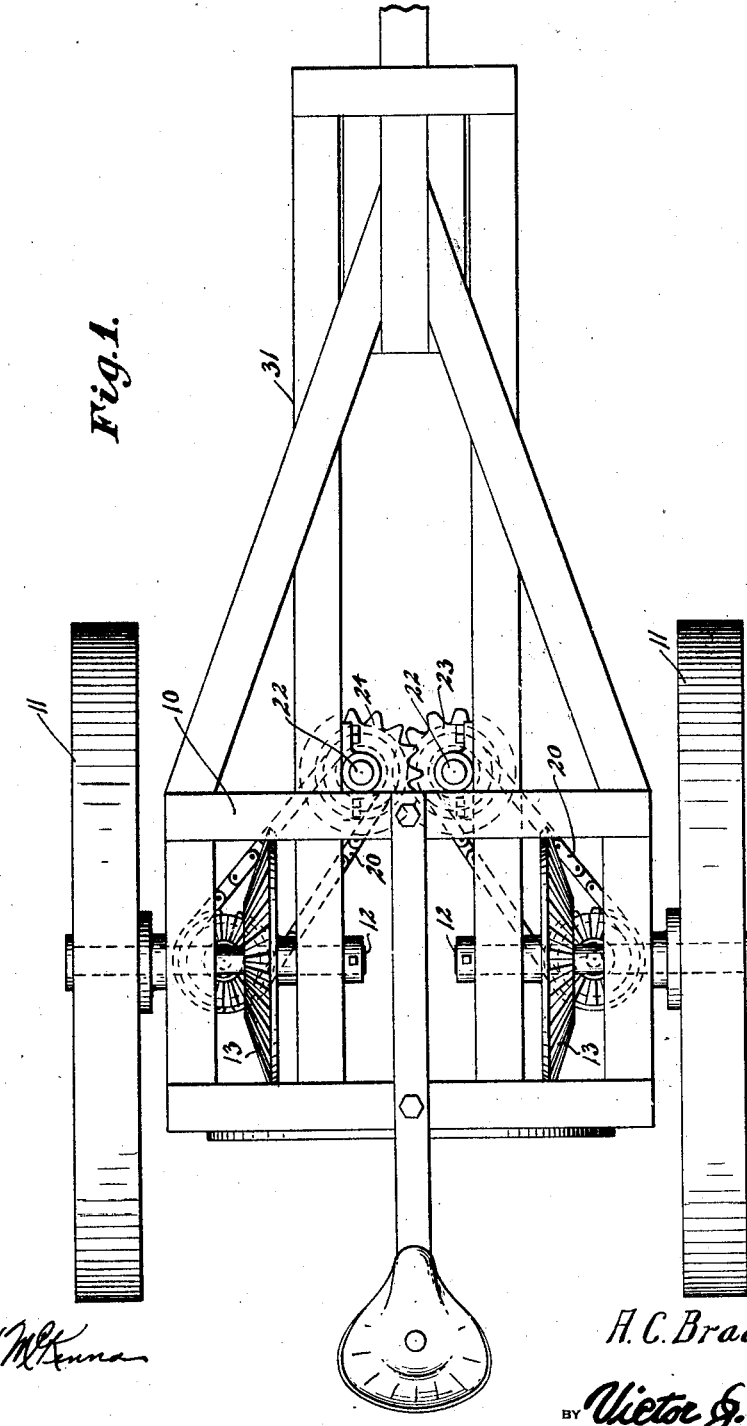

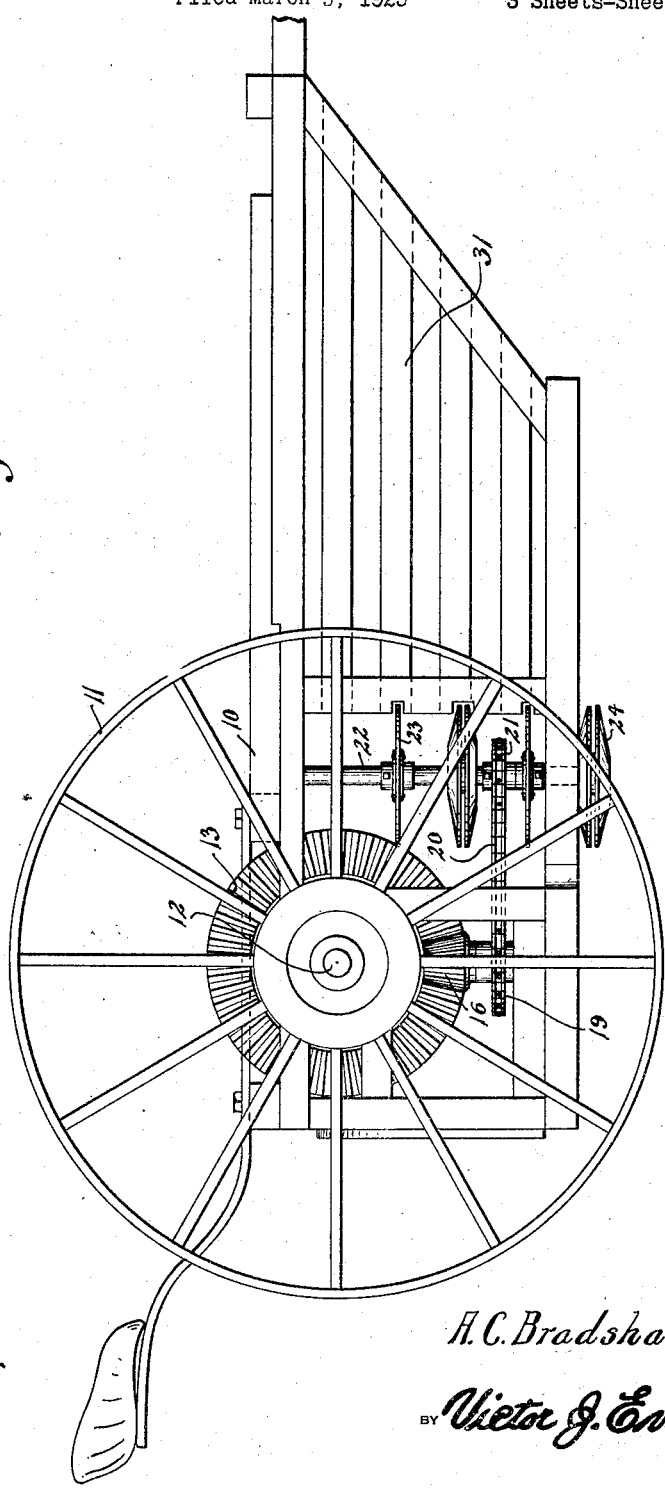

March 9, 1926.
A. C. BRADSHAW
STALK CUTTING MACHINE
Filed March 3, 1925
1,576,405
3 Sheets-Sheet 3
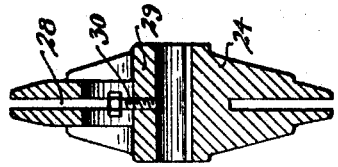
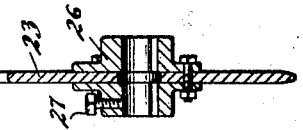
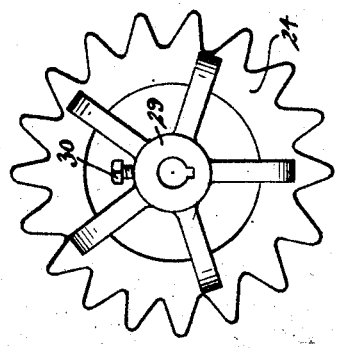
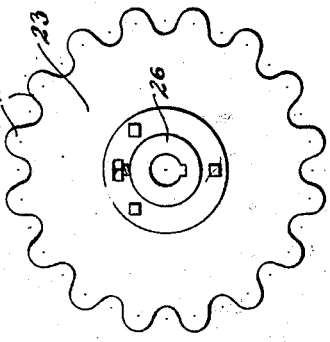
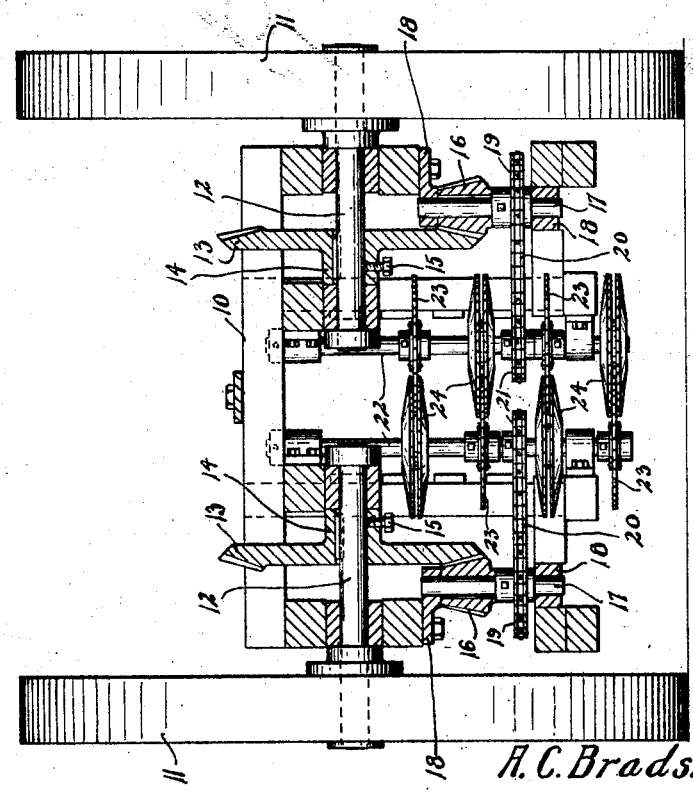
A. C. Bradshaw,
INVENTOR

Patented Mar. 9, 1926.

1,576,405

UNITED STATES PATENT OFFICE.

ALBERT C. BRADSHAW, OF SAN ANTONIO, TEXAS.

STALK-CUTTING MACHINE.

Application filed March 3, 1925. Serial No. 12,953.

*To all whom it may concern:*

Be it known that I, ALBERT C. BRADSHAW, a citizen of the United States, residing at San Antonio, in the county of Bexar and State of Texas, have invented new and useful Improvements in Stalk-Cutting Machines, of which the following is a specification.

It is the purpose of this invention to provide a stalk cutter in the nature of a machine adapted to be moved over a row of stalks, and including spaced series of blades, each of which operates through a suitable guard, cooperating with the latter in a manner to cut the stalks into small pieces or sections, so they can be subsequently plowed under the surface and used as a fertilizer.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a top plan view of the machine.

Figure 2 is a side elevation.

Figure 3 is a transverse sectional view.

Figure 4 is a view in elevation of one of the knife guards.

Figure 5 is a sectional view taken through Figure 4.

Figure 6 is a view in elevation of one of the knives.

Figure 7 is a sectional view taken through Figure 6.

The machine forming the subject matter of the present invention comprises a wheeled frame indicated generally at 10 and it is to be understood that this frame may be constructed from any suitable material, and also vary in size and configuration without departing from the spirit of the invention. The ground wheels are indicated at 11, and for each wheel I provide a shaft 12. These shafts are arranged in spaced relation as clearly shown in Figure 3, and mounted on each shaft is a large bevelled gear 13. The gear is preferably formed with a hub like portion 14 which surrounds the adjacent shaft, and held fixed relatively thereto, to turn therewith by means of a threaded element 15. Meshing with each gear 12 is a pinion 16 which is keyed or otherwise suitably secured on a short vertical shaft 17, the ends of which are mounted in suitable bearings 18. Each shaft 17 has fixed thereto a sprocket 19 around which is trained an endless chain 20, the latter being also trained about a similar sprocket 21 fixed upon a vertical shaft 22. Upon inspection of Figure 3, it will be noted that there are two of these shafts 22, each being rotated from the adjacent ground wheel 11 through the instrumentality of the gears and endless chain above described. The shafts 22 are arranged in close relation to each other, immediately at opposite sides of the longitudinal center of the machine as clearly illustrated in Figure 1, and consequently the chains 20 are arranged in convergent relation. Each shaft 22 supports a plurality of knives and guards of the character illustrated in Figures 4 to 7 inclusive, each knife being indicated at 23, while each guard is indicated at 24. These knives and guards are alternately arranged on each shaft 22, and each knife on one shaft operates through and cooperates with one of the guards mounted on the other shaft 22 as illustrated in Figure 3.

Each knife 23 is of disk like formation, having teeth 25 projecting from the periphery thereof, also including a hub 26 which is held fixed upon the particular shaft 22 by means of a threaded fastening element 27. Each guard 24 is of similar contour having its periphery slotted as at 28 to receive the teeth of the adjacent blade 23, also including a hub 29 which is fixed upon the particular shaft 22 by means of a threaded fastening element 30. This arrangement is shown in Figure 3, and it might here be stated, that the shafts 22 may vary in length, and that any number of knives and guards may be used on any shaft, and spaced apart any desired distance. The shafts 22 are simultaneously rotated from the ground wheels 11 in the manner above described, and as the stalks pass between the shafts 22, they are cut up into small pieces or sections, and fall upon the ground so that they can be subsequently plowed under and utilized to enrich the soil. The stalks are guided between the shafts 22 by a slatted frame like structure indicated generally at 31, and which projects forwardly from the end of the machine as clearly shown in Figures 1 and 2. If desired the machine may also be used for topping cotton, in which instance, the lowermost knives and guards will be removed from the shafts 22.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

A stalk cutter comprising a wheeled frame, an axle for each wheel, spaced vertically disposed shafts journaled at the forward end of the frame and arranged in juxtaposition, a plurality of disk-like knives and guards alternately arranged in spaced superimposed relation on each of said shafts, with the knives of one shaft operating in the guards of the adjacent shaft, a stub shaft journaled beneath each axle and arranged at a right angle thereto, gearing for rotating the stub shaft incident to the rotation of said axle, sprocket wheels arranged on the first mentioned shaft and also on each stub shaft, and convergently disposed endless chains trained over each pair of sprockets, whereby said vertical shafts are simultaneously rotated from said axles.

In testimony whereof I affix my signature.

ALBERT C. BRADSHAW.